US006795212B1

(12) United States Patent
Ichikawa

(10) Patent No.: US 6,795,212 B1
(45) Date of Patent: Sep. 21, 2004

(54) PRINTING METHOD AND APPARATUS

(75) Inventor: Koji Ichikawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/395,786

(22) Filed: Sep. 14, 1999

(30) Foreign Application Priority Data

Sep. 18, 1998 (JP) ............................................ 10-264995

(51) Int. Cl.[7] .......................... G06K 15/02; H04N 5/76
(52) U.S. Cl. .................. 358/1.9; 348/231.3; 348/231.5; 348/231.6
(58) Field of Search ................................ 358/1.9, 3.24, 358/3.26, 516, 527; 348/207.2, 222.1, 223.1, 229.1, 231.5–231.6, 231.3; 355/4; 396/319, 310–311, 321

(56) References Cited

U.S. PATENT DOCUMENTS 5,467,168 A * 11/1995 Kinjo et al. ................... 355/41
5,481,330 A * 1/1996 Yamasaki ...................... 355/41

FOREIGN PATENT DOCUMENTS

| JP | 62-274889 | 11/1987 | ............ H04N/9/04 |
| JP | 8-62741 | 3/1996 | ............ G03B/27/80 |

* cited by examiner

Primary Examiner—Scott Rogers
(74) Attorney, Agent, or Firm—Sughrue Mion, PLLC

(57) ABSTRACT

A parameter determining part determines a parameter for an automatic image correction in accordance with inputted images to be printed, and an automatic image correcting part corrects the inputted images in accordance with the determined parameter. Consequently, the printed images have desirable qualities. The parameter determining part also determines whether multiple images to be printed are a series of images or not in accordance with additional information about the inputted images read by an additional information reading part. If the parameter determining part determines that the inputted images are the series of images, it fixes the parameter for all of the inputted images. This prevents the printed images from being different in color, gradation and gray balance.

9 Claims, 6 Drawing Sheets

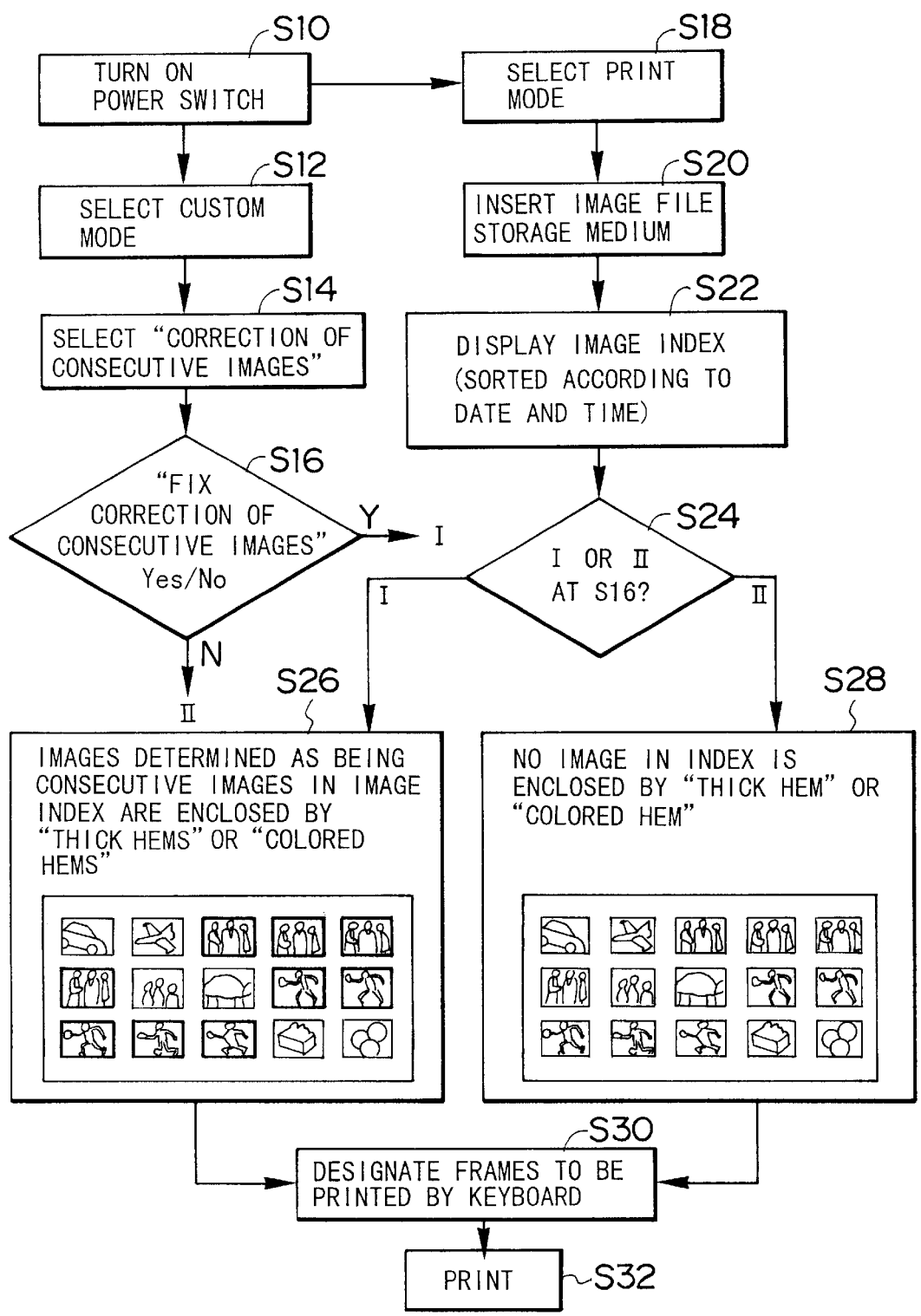
F I G. 7

PRINTING METHOD AND APPARATUS

BACKGROUND OF THE INVENTION

1. Field of the Invention

The present invention relates generally to a printing method and apparatus, and more particularly to a printing method and apparatus that determines parameters for automatic image correction processing in accordance with inputted images to be printed, that automatically corrects the inputted images with the determined parameters, and that prints the corrected images.

2. Description of Related Art

A conventional printing apparatus such as a digital printer is usually provided with an automatic image correcting function for automatically correcting the differences in color and gradation between images to be printed that have been captured by different cameras, and for automatically correcting an image that has been captured with an improper brightness and/or white balance due to an unsatisfactory automatic exposure (AE) adjustment and/or automatic white balance (AWB) adjustment in the camera, so that the printed images can have a desirable image quality.

Japanese Patent Provisional Publication No. 8-62741 has proposed a gradation correcting apparatus (mainly for a video printer) for automatically determining the features (e.g., back-light or front-light) of a scene with reference to an inputted image and correcting the gradation of the inputted image.

Japanese Patent Provisional Publication No. 62-274889 has proposed an electronic still camera that performs a high-speed consecutive shooting with the color balance being fixed, thus eliminating the differences in the color balance between the consecutive frames even if an object in a saturated color passes the subject area during the high-speed consecutive shooting.

Suppose that a printer determines parameters for the automatic image correction on a frame-by-frame basis for inputted consecutive images and corrects the images on a frame-by-frame basis according to the respective determined parameters in the case that the camera has steadily captured the consecutive images under fixed shooting conditions such as color balance. In this case, for example, if an object in a saturated color has passed the subject area during the consecutive shooting or if the positions of clouds in a blue sky have changed every moment, the printed images are different in color, gradation and gray balance between the frames.

SUMMARY OF THE INVENTION

In view of the foregoing, it is an object of the present invention to provide a printing method and apparatus that are able to steadily print a series of related images with color, gradation and gray balance being unchanged.

To achieve the above-mentioned object, the present invention is directed to a printing method, comprising the steps of: determining whether or not inputted images to be printed include a series of images captured under fixed conditions; and if the inputted images are determined as including the series of images in the determining step, calculating a parameter for automatic image correction in accordance with at least one of the inputted images, fixing the parameter, correcting the inputted images in accordance with the fixed parameter, and printing corrected images.

According to the present invention, to print the series of images captured under fixed conditions, the parameter for the automatic image correction is fixed and the images are corrected according to the same fixed parameter. This prevents the differences in the color, gradation and gray balance between the printed images.

Preferably, the printing method is characterized in that the determining step comprises the step of reading additional information concerning the inputted images. The inputted images are determined as including the series of images if the read additional information indicates that the inputted images include the series of images, if the read additional information indicates that the inputted images include the series of images and that shooting time intervals of the inputted images were no more than a preset value, if the read additional information indicates that shooting time intervals of the inputted images were no more than a preset value and that an exposure of the inputted images was fixed, or if the read additional information indicates that the inputted images include the series of images, that shooting time intervals of the inputted images were no more than a preset value and that an exposure of the inputted images was fixed.

Preferably, the parameter for automatic image correction is calculated in accordance with the first image among the series of images or among images to be printed that are selected from the series of images. Alternatively, the parameter for automatic image correction is calculated by averaging parameters, each of which is calculated in accordance with each image of the series of images or in accordance with each of images to be printed that are selected from the series of images. The parameter for automatic image correction may be calculated in accordance with one image designated among the series of images.

The series of images may include consecutive images or images composing a panoramic image.

The present invention is also directed to a printing apparatus, comprising: a determination device which determines whether or not inputted images to be printed include a series of images captured under fixed conditions; a calculator which calculates a parameter for automatic image correction in accordance with at least one of the inputted images, the calculator calculating a common parameter for automatic image correction for the inputted images if the determination device determines that the inputted images include the series of images; an image corrector which corrects the inputted images in accordance with the parameter calculated by the calculator; and a printing device which prints images corrected by the image corrector.

If the inputted images include the series of images, the calculator calculates the common parameter for the automatic image correction, which is used for processing all of the series of images. The image corrector corrects the series of images according to the same common parameter. This prevents the printed images from being different in color, gradation and gray balance.

Preferably, the printing apparatus further comprises a mode selector which selects one of: a mode in which the common parameter is fixed and used in the image corrector if the determination device determines that the inputted images include the series of images; and a mode in which respective parameters for automatic image correction are calculated in accordance with respective images of the series of images and the respective parameters are used in the image corrector even if the determination device determines that the inputted images include the series of images.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 7 is a flow chart of assistance in explaining the operation of the printing apparatus in FIG. 1.

DETAILED DESCRIPTION OF THE PREFERRED EMBODIMENT

This invention will be described in further detail by way of example with reference to the accompanying drawings.

Figure 1:
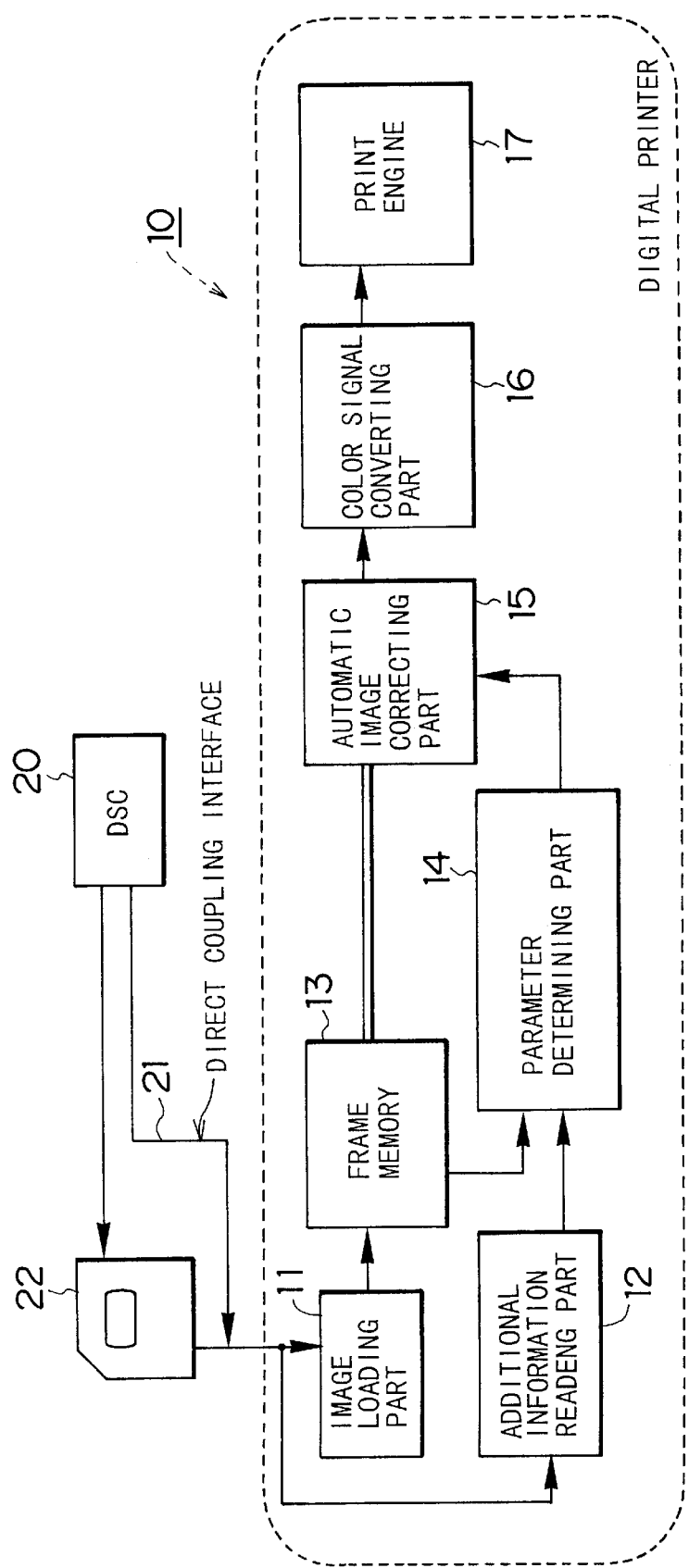
FIG. 1 is a block diagram showing an embodiment of a printing apparatus according to the present invention.

FIG. 1 is a block diagram showing a preferred embodiment of a printing apparatus according to the present invention.

As shown in FIG. 1, the printing apparatus 10 is a digital printer, which comprises an image loading part 11, an additional information reading part 12, a frame memory 13, a parameter determining part 14, an automatic image correcting part 15, a color signal converting part 16, and a print engine 17.

The printing apparatus 10 can connect to a digital still camera 20 through a direct coupling interface 21 so that the printing apparatus 10 can directly capture an image file, which is created by the digital still camera 20. The printing apparatus 10 has a card slot, into which an image file storage medium 22 such as a solid-state floppy disk card (SSFDC) and a PC card used in the digital still camera 20 is inserted. The printing apparatus 10 can capture the image file from the image file storage medium 22, which is inserted in the card slot.

In a normal shooting mode, the digital still camera 20 captures image signals (red, green and blue (RGB) signals) of one frame every time a shutter release button is pressed, and converts the RGB signals into a luminance signal Y and color difference signals Cr and Cb (hereinafter referred to as YC signals). Further, the digital still camera 20 compresses the YC signals into image data in a predetermined image file format, and stores the compressed image data in the image file storage medium 22.

The luminance signal Y and the color difference signals Cr and Cb are found according to the RGB signals by the following equations:

$Y=0.299R+0.587G+0.114B$;

$Cr=0.713 \times (R-Y)$;

$Cb=0.564 \times (B-Y)$;

where R, G and B are integers 0–255.

The digital still camera 20 has a consecutive shooting mode for consecutively shooting a predetermined number of times at predetermined time intervals. In the consecutive shooting mode, a series of consecutive images are captured under fixed shooting conditions (e.g., exposure conditions and color balance adjustment conditions), which are determined when the first frame is captured. The digital still camera 20 records the shooting date and time, the above-mentioned shooting conditions (e.g., an f-number and a shutter speed), etc. as additional information concerning the image data into the image file. In the consecutive shooting mode, the digital still camera 20 also records consecutive shooting information indicating that the stored images are consecutive.

If a frame to be printed is selected after the image file storage medium 22 is inserted into the printing apparatus 10 or after the digital still camera 20 is connected to the printing apparatus 10, the image loading part 11 of the printing apparatus 10 captures the image data from the image file for the frame selected to be printed, and expands and restores the compressed image data into the original YC signals. Then, the image loading part 11 stores the YC signals in the frame memory 13.

The additional information reading part 12 reads the additional information from the image file for the frame selected to be printed, and transfers the read additional information to the parameter determining part 14.

The parameter determining part 14 determines parameters (automatic setup parameters) for an automatic image correction performed by the automatic image correcting part 15. The parameter determining part 14 sets the determined parameters in the automatic image correcting part 15. Normally, the parameter determining part 14 determines the parameters for each inputted image to be printed in accordance with the YC signals stored in the frame memory 13.

The parameter determining part 14 also determines whether a series of inputted images to be printed is consecutive images or not in accordance with the additional information inputted from the additional information reading part 12. If yes, the parameter determining part 14 determines and fixes the parameters in accordance with at least one image among the series of inputted images.

The parameter determining part 14 determines whether the series of inputted images is consecutive images or not as described hereinbelow:

1) If the additional information inputted from the additional information reading part 12 includes the consecutive shooting information, the parameter determining part 14 unconditionally determines that the inputted images are consecutive images;

2) If the additional information includes the consecutive shooting information and the shooting time intervals were no more than a predetermined threshold, the parameter determining part 14 determines that the inputted images are consecutive images;

3) If the additional information includes the consecutive shooting information and the shooting time intervals were no more than a predetermined threshold, and if the exposure was set manually and/or the f-number and the shutter speed were fixed, the parameter determining part 14 determines that the inputted images are consecutive images; or 4) In the case of the series of inputted images were captured by a digital still camera that cannot records the consecutive shooting information in the additional information, if the shooting time intervals were no more than a predetermined threshold, and if the exposure was set manually and/or the f-number and the shutter speed were fixed, the parameter determining part 14 determines that the inputted images are consecutive images.

The parameter determining part 14 determines the parameters to be fixed in accordance with the frame images described below:

1) The parameter determining part 14 determines the parameters to be fixed in accordance with the first frame image among the consecutive images;

2) The parameter determining part 14 determines the parameters to be fixed in accordance with the first frame image among the images to be printed, which are selected from the consecutive images;

3) The parameter determining part 14 determines averages of parameters, each set of which is calculated for each frame of the consecutive images, as the parameters to be fixed;

4) The parameter determining part 14 determines averages of the parameters, each set of which is calculated for each frame of the images to be printed, which are selected from the consecutive images, as the parameters to be fixed; or 5) The parameter determining part 14 determines the parameters to be fixed in accordance with one of the consecutive images designated by the operator.

The automatic image correcting part 15 corrects the RGB signals stored in the frame memory 13 in accordance with the parameters, which are set by the parameter determining part 14, to adjust the color, gradation, gray balance, and the like of the image to be printed. The parameters are normally set in the automatic image correcting part 15 on a frame-by-frame basis by the parameter determining part 14. In the case of the printing of the consecutive images, the parameters are fixed, and the same parameters are used for all the consecutive images. Therefore, the color, gradation and the gray balance of the printed images are unchanged even if there are differences between the consecutive images in the state of the main subject and/or the background.

A description will now be given of examples of a method for determining the parameters by the parameter determining part 14 and an automatic image correction at the automatic image correcting part 15. As typical examples, a description will be given of a method for determining a parameter for an automatic white balance and a parameter for a gradation correction.

Figure 2:
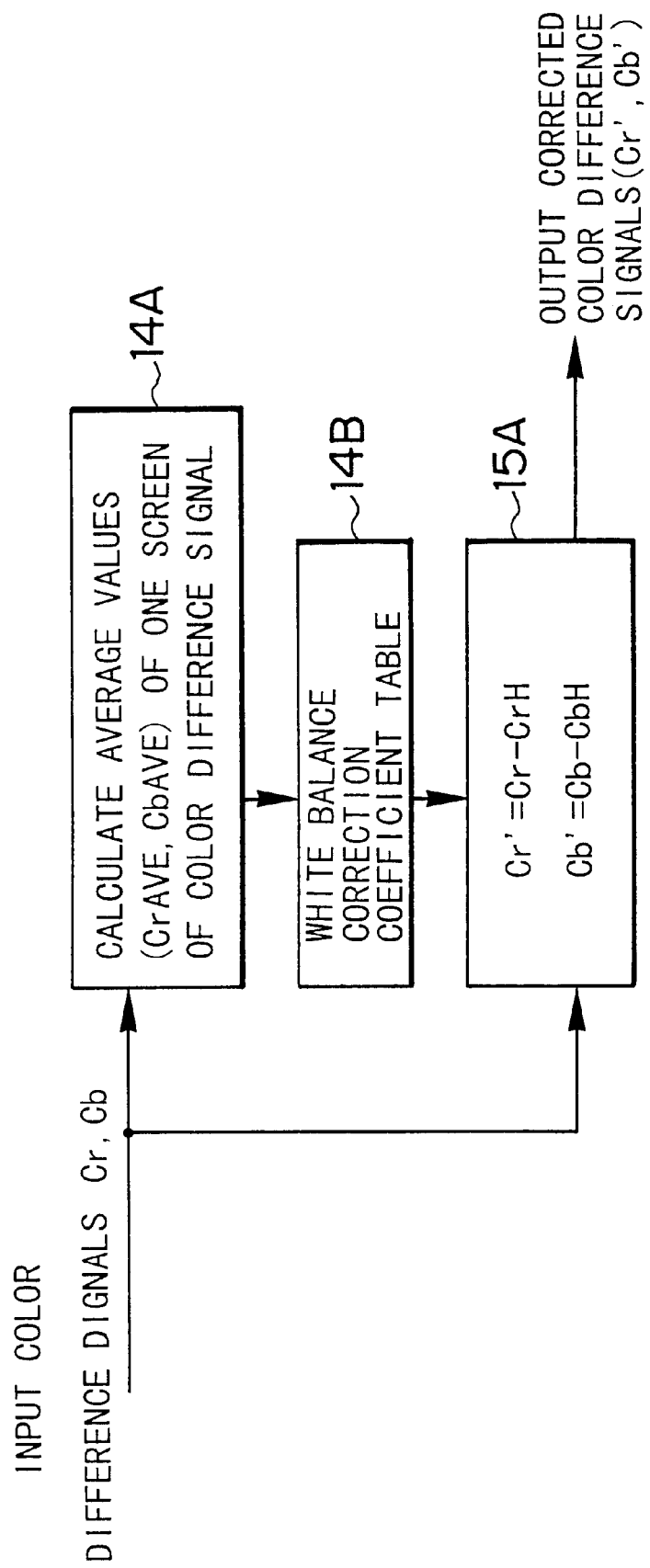
FIG. 2 is a block diagram showing an example of a parameter determining part and an automatic image correcting part in FIG. 1.

To determine the parameter for the automatic white balance, the parameter determining part 14 captures the color difference signals Cr and Cb into a calculation part 14A from the frame memory 13 as shown in FIG. 2. The calculation part 14A calculates averages CrAVE and CbAVE of the color difference signals Cr and Cb, respectively, in one frame.

Figure 3:
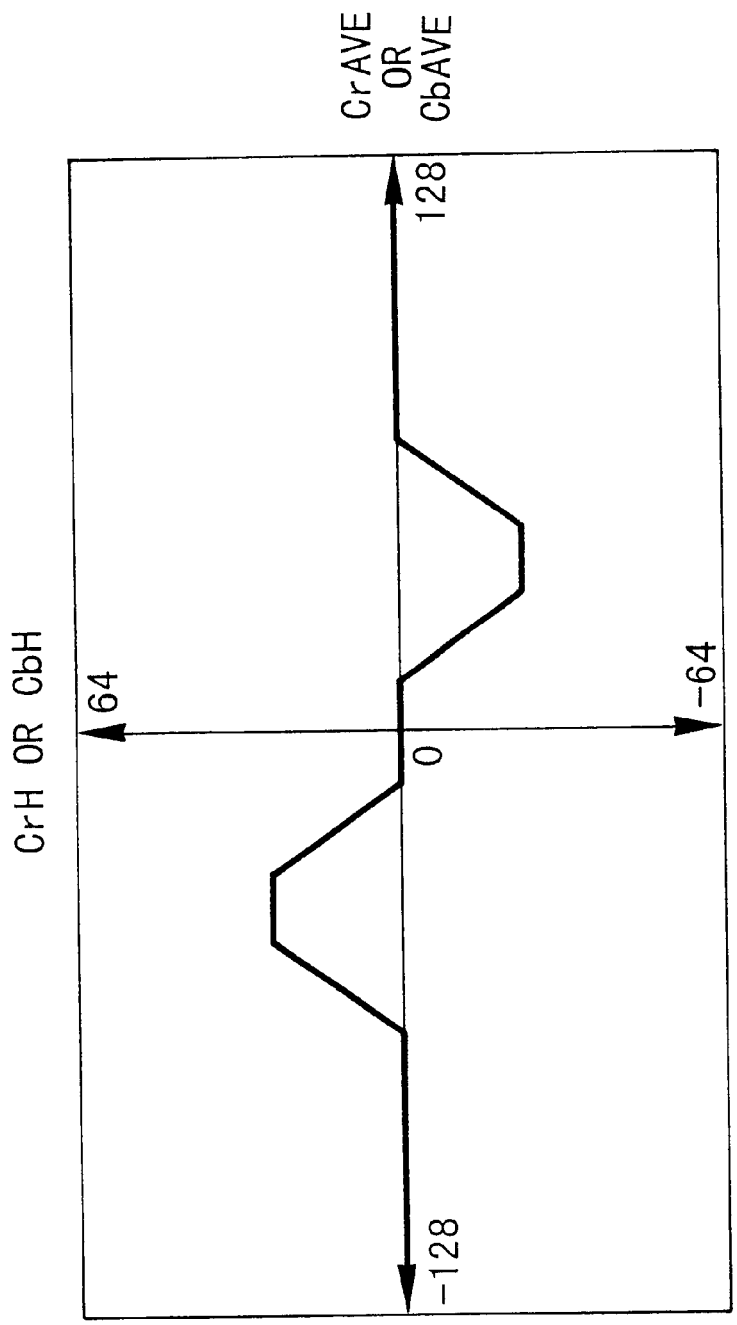
FIG. 3 is a view showing an example of a white balance correction coefficient table in FIG. 2.
Figure 4:
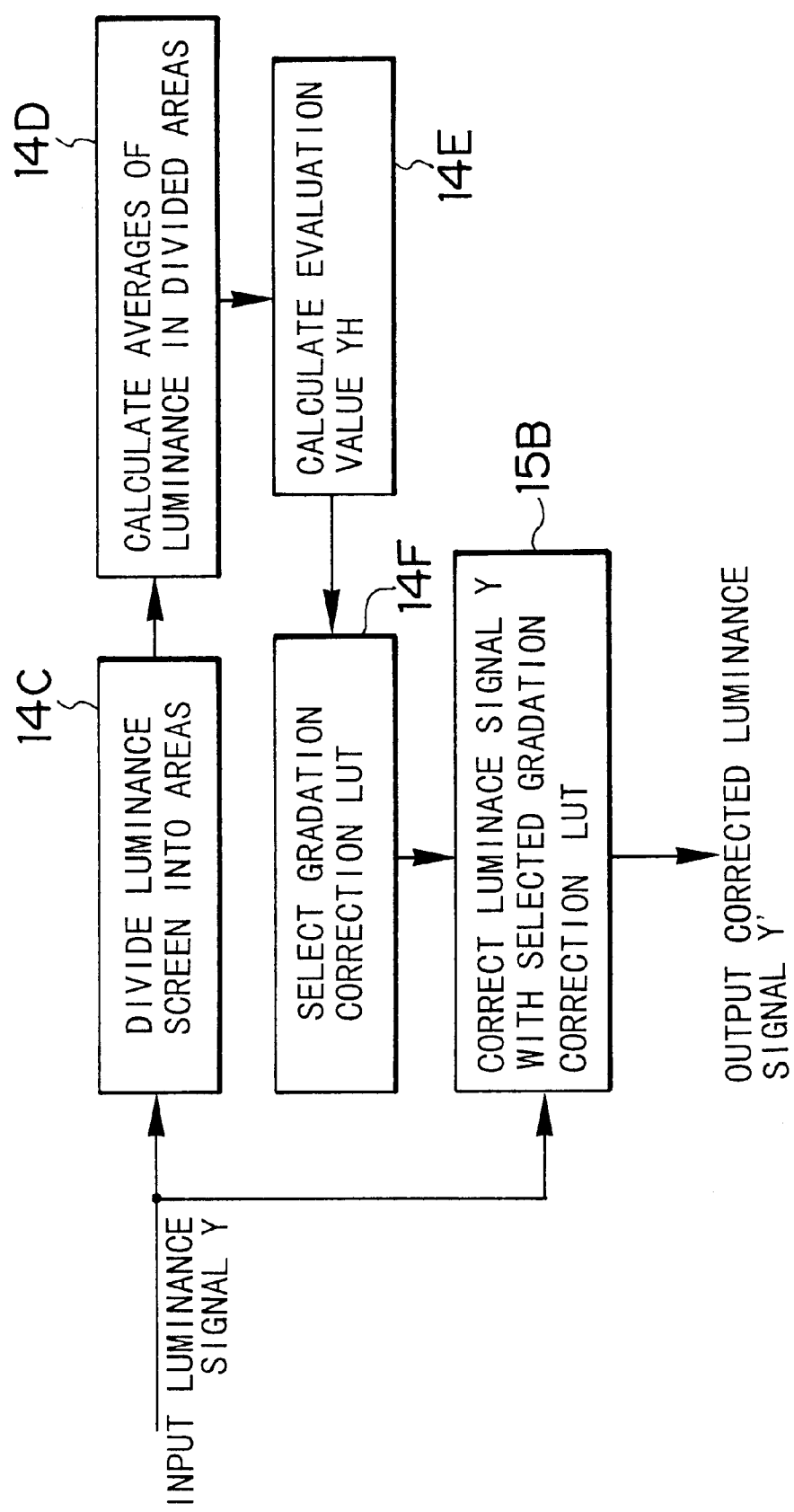
FIG. 4 is a block diagram showing another example of the parameter determining part and the automatic image correcting part in FIG. 1.

The parameter determining part 14 has a white balance correction coefficient table 14B as shown in FIG. 3, and it finds white balance correction coefficients CrH and CbH from the white balance correction coefficient table 14B in accordance with the averages CrAVE and CbAVE, respectively. The automatic setup parameters in this processing are the white balance correction coefficients CrH and CbH, which are set in the automatic image correcting part 15.

As shown in FIG. 2, a calculation part 15A of the automatic image correcting part 15 receives the color difference signals Cr and Cb from the frame memory 13, and receives the white balance correction coefficients CrH and CbH from the white balance correction coefficient table 14B. The calculation part 15A finds and outputs corrected color difference signals Cr' and Cb' from the color difference signals Cr and Cb and the white balance correction coefficients CrH and CbH, respectively, as follows:

$Cr'=Cr-CrH;$ $Cb'=Cb-CbH.$

Figure 5:
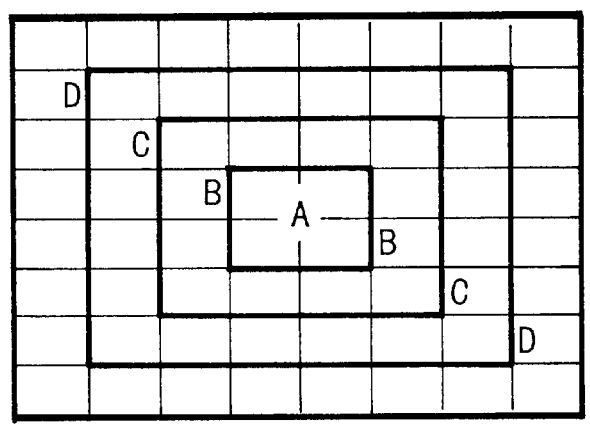
FIG. 5 is a view showing an example of a divided frame.

To determine the parameter for the gradation correction, the parameter determining part 14 receives divided luminance signals Y of divided areas from the frame memory 13 through a division input part 14C. As shown in FIG. 5, one frame is divided into sixty-four (=8×8), and the divided areas are grouped into four areas A–D.

An average luminance calculating part 14D calculates averages of luminance $Y_A$, $Y_B$, $Y_C$ and $Y_D$ from the luminance signals in the divided areas A–D, respectively, and an evaluation value calculating part 14E finds an evaluation value YH, which represents the brightness, according to the averages of luminance $Y_A$, $Y_B$, $Y_C$ and $Y_D$ by a weighting calculation as follows:

$YH=0.5\times Y_A+0.25\times Y_B+0.175\times Y_C+0.075\times Y_D.$

Figure 6:
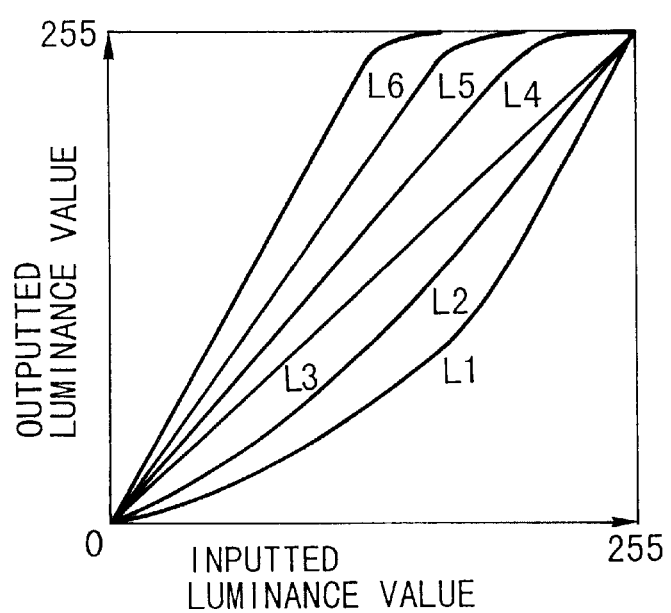
FIG. 6 is a view showing examples of gradation correction lookup tables.

The evaluation value YH is outputted to a gradation correction lookup table (LUT) selecting part 14F. As shown in FIG. 6, the gradation correction LUT selecting part 14F has six LUTs (L1–L6), and selects an appropriate gradation correction LUT according to the inputted evaluation value YH as shown in the following TABLE 1.

TABLE 1

| Evaluation value YH | Type of LUT to be applied |
| --- | --- |
| 210 < YH | L1 |
| 160 < YH ≦ 210 | L2 |
| 100 < YH ≦ 160 | L3 |
| 64 < YH ≦ 100 | L4 |
| 48 < YH ≦ 64 | L5 |
| YH ≦ 48 | L6 |

In this processing, the gradation correction LUT, which is selected as described above, is used as the automatic setup parameter, and the selected gradation correction LUT is used at the automatic image correcting part 15. More specifically, a gradation correction LUT converting part 15B corrects the gradation of the luminance signals Y inputted from the frame memory 13 in accordance with the gradation correction LUT selected by the parameter determining part 14.

In FIG. 1, the color difference signals Cr' and Cb' and the luminance signal Y' corrected by the automatic image correcting part 15 are transferred to the color signal converting part 16. The color signal converting part 16 converts the color difference signals Cr' and Cb' and the luminance signal Y' into RGB signals and converts the RGB signals into yellow, magenta and cyan (YMC) signals, or converts the color difference signals Cr' and Cb' and the luminance signal Y' directly into the YMC signals. The YMC signals are sequentially transferred to the print engine 17.

The print engine 17 has a printing paper feeder, a thermal head, a fixing lamp, etc. To print a color image, the printing paper is fed and the thermal head is controlled according to the Y (yellow) signal to develop a yellow layer of the printing paper. Then, the fixing lamp fixes the yellow color on the printing paper. Similarly, magenta and cyan layers of the printing paper are developed according to the M and C signals, respectively. Thus, the color image is printed on the printing paper.

A description will be given of the operation of the printing apparatus 10, which is constructed in the above-mentioned manner, with reference to the flow chart of FIG. 7.

When a power switch of the printing apparatus 10 is turned on (S10), a mode can be selected between a custom mode and a print mode. If the custom mode is selected (S12), a variety of instructions can be given. If "correction of consecutive images" is selected at S14, "fix correction of consecutive images" is instructed (S16). If the "correction of consecutive images" is not selected, a processing that does not include the "fix correction of consecutive images" (i.e., the parameters are not fixed even for the consecutive images) is instructed.

In the custom mode, the conditions for determining whether the series of inputted images is consecutive images or not may be designated, and the references for selecting a frame with which the parameters are fixed may also be designated.

If the print mode is selected and the image file storage medium 22 is inserted into the card slot (S18 and S20), the image data for displaying a list of multiple frame images stored in the image file storage medium 22 is read, and the image index is displayed on an external monitor, a liquid crystal display monitor built-in the printer, or the like (S22). In the image index, the frame images are sorted according to the file date and time, and fifteen frames are displayed at the steps 26 and 28. The subsequent frames can be displayed on the next screen.

At S24, it is determined whether a mode I (the "fix correction of consecutive images") is selected or not in the custom mode. If the "fix correction of consecutive images" is selected, the processing goes to S26. At 26, it is determined whether frame images in the image index are consecutive images or not, and the frame images determined as consecutive images are hemmed with "thick hems" or "colored hems". Therefore, the operator can distinguish the consecutive images from the other images with reference to the hems.

If the operator designates frames to be printed in the image index by operating a keyboard or the like and presses an execution button (S30), the image data and the additional information corresponding to the designated frames are captured from image files stored in the image file storage medium 22. After the parameters are determined and the images are corrected with the parameters, the corrected images are printed (S32). If the consecutive images are designated to be printed, the consecutive images are corrected with the same fixed parameters.

At S24, on the other hand, if a mode II is selected in the custom mode, the processing goes to S28. At S28, the frames in the image index are displayed without distinguishing the consecutive images from the other images. In this case, it is not determined whether the frames in the image index are the consecutive images or not. Then, the frames to be printed are designated with reference to the image index (S30). The designated frame images are printed without distinguishing the consecutive images from the other images. More specifically, even if the consecutive images are printed, each set of parameters is determined for each frame and the each image is corrected with each set of parameters.

The printing apparatus according to this embodiment captures the image data and the additional information from the image file created by the digital still camera, but the present invention should not be restricted to this. The printing apparatus may also capture the image data and the additional information by means of a film scanner or the like, directly or indirectly from silver halide photographic film on which the additional information can be recorded.

In this embodiment, a series of related images is composed from the consecutive images, but it may be composed from images to be combined for composing a panoramic image. A camera has recently proposed which is capable of satisfactorily capturing a panoramic image, which is composed of multiple continuous frame images. When the frame images composing the panoramic image are printed on a frame-by-frame basis without being combined, they are printed with the parameters for the automatic image correction being fixed as is the case with the consecutive images.

In addition, the printing apparatus according to the present invention is not restricted to this embodiment. The present invention may be applied to anything that is capable of printing inputted images by automatically correcting inputted images according to the images to be printed. The parameters are not restricted to those of this embodiment.

As set forth hereinabove, according to the present invention, the inputted images are automatically corrected according to the inputted images to be printed, and the corrected images are printed. In particular, the series of related images is printed with the parameters for automatically correcting the images being fixed. Therefore, the series of printed images with unchanged color, gradation, gray balance, and the like can be printed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A printing method, comprising the steps of:

determining whether or not inputted images to be printed include a series of images captured under fixed conditions; and if the inputted images are determined as including the series of images in the determining step, calculating a parameter for automatic image correction in accordance with at least one of the inputted images, fixing the parameter, correcting the inputted images in accordance with the fixed parameter, and printing corrected images, wherein the determining step comprises the step of reading additional information concerning the inputted images, the inputted images being determined as including the series of images if the read additional information indicates that the inputted images include the series of images and that shooting time intervals of the inputted images were no more than a preset value.

2. A printing method, comprising the steps of:

determining whether or not inputted images to be printed include a series of images captured under fixed conditions; and if the inputted images are determined as including the series of images in the determining step, calculating a parameter for automatic image correction in accordance with at least one of the inputted images, fixing the parameter, correcting the inputted images in accordance with the fixed parameter, and printing corrected images, wherein the determining step comprises the step of reading additional information concerning the inputted images, the inputted images being determined as including the series of images if the read additional information indicates that shooting time intervals of the inputted images were no more than a preset value and that an exposure of the inputted images was fixed.

3. A printing method, comprising the steps of:

determining whether or not inputted images to be printed include a series of images captured under fixed conditions; and if the inputted images are determined as including the series of images in the determining step, calculating a parameter for automatic image correction in accordance with at least one of the inputted images, fixing the parameter, correcting the inputted images in accordance with the fixed parameter, and printing corrected images, wherein the determining step comprises the step of reading additional information concerning the inputted images, the inputted images being determined as including the series of images if the read additional information indicates that the inputted images include the series of images, that shooting time intervals of the inputted images were no more than a preset value and that an exposure of the inputted images was fixed.

4. A printing apparatus, comprising:

a determination device which determines whether or not inputted images to be printed include a series of images captured under fixed conditions;

a calculator which calculates a parameter for automatic image correction in accordance with at least one of the inputted images, the calculator calculating a common parameter for automatic image correction for the inputted images if the determination device determines that the inputted images include the series of images;

an image corrector which corrects the inputted images in accordance with the parameter calculated by the calculator;

a printing device which prints images corrected by the image corrector; and a mode selector which selects one of:

a mode in which the common parameter is fixed and used in the image corrector if the determination device determines that the inputted images include the series of images; and a mode in which respective parameters for automatic image correction are calculated in accordance with respective images of the series of images and the respective parameters are used in the image corrector even if the determination device determines that the inputted images include the series of images.

5. A printing apparatus, comprising:

a determination device which determines whether or not inputted images to be printed include a series of images captured under fixed conditions;

a calculator which calculates a parameter for automatic image correction in accordance with at least one of the inputted images, the calculator calculating a common parameter for automatic image correction for the inputted images if the determination device determines that the inputted images include the series of images;

an image corrector which corrects the inputted images in accordance with the parameter calculated by the calculator;

a printing device which prints images corrected by the image corrector; and a reader which reads additional information concerning the inputted images;

wherein the determination device determines that the inputted images include the series of images if the read additional information indicates that the inputted images include the series of images and that shooting time intervals of the inputted images were no more than a preset value is read.

6. A printing apparatus, comprising:

a determination device which determines whether or not inputted images to be printed include a series of images captured under fixed conditions;

a calculator which calculates a parameter for automatic image correction in accordance with at least one of the inputted images, the calculator calculating a common parameter for automatic image correction for the inputted images if the determination device determines that the inputted images include the series of images;

an image corrector which corrects the inputted images in accordance with the parameter calculated by the calculator;

a printing device which prints images corrected by the image corrector; and a reader which reads additional information concerning the inputted images;

wherein the determination device determines that the inputted images include the series of images if the read additional information indicates that shooting time intervals of the inputted images were no more than a preset value and that an exposure of the inputted images was fixed is read.

7. A printing apparatus, comprising:

a determination device which determines whether or not inputted images to be printed include a series of images captured under fixed conditions;

a calculator which calculates a parameter for automatic image correction in accordance with at least one of the inputted images, the calculator calculating a common parameter for automatic image correction for the inputted images if the determination device determines that the inputted images include the series of images;

an image corrector which corrects the inputted images in accordance with the parameter calculated by the calculator;

a printing device which prints images corrected by the image corrector; and a reader which reads additional information concerning the inputted images;

wherein the determination device determines that the inputted images include the series of images if the read additional information indicates that the inputted images include the series of images, that shooting time intervals of the inputted images were no more than a preset value and that an exposure of the inputted images was fixed is read.

8. A printing method, comprising the steps of:

determining whether or not inputted images to be printed include a series of images captured under fixed conditions; and if the inputted images are determined as including the series of images in the determining step, calculating a parameter for automatic image correction in accordance with at least one of the inputted images, fixing the parameter, correcting the inputted images in accordance with the fixed parameter, and printing corrected images, wherein the fixed conditions include predetermined time intervals.

9. A printing method, comprising the steps of:

determining whether or not inputted images to be printed include a series of images captured under fixed conditions; and if the inputted images are determined as including the series of images in the determining step, calculating a parameter for automatic image correction in accordance with at least one of the inputted images, fixing the parameter, correcting the inputted images in accordance with the fixed parameter, and printing corrected images, wherein the fixed conditions include shooting time intervals no more than a preset value.

* * * * *